US007421111B2

(12) United States Patent
Dietz et al.

(10) Patent No.: US 7,421,111 B2
(45) Date of Patent: Sep. 2, 2008

(54) LIGHT PEN SYSTEM FOR PIXEL-BASED DISPLAYS

(75) Inventors: Paul H. Dietz, Hopkinton, MA (US); Darren L. Leigh, Belmont, MA (US); Ramesh Raskar, Cambridge, MA (US); Johnny Chung Lee, Pittsburgh, PA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 794 days.

(21) Appl. No.: 10/704,098

(22) Filed: Nov. 7, 2003

(65) Prior Publication Data

US 2005/0099405 A1 May 12, 2005

(51) Int. Cl.
*G06K 9/00* (2006.01)
(52) U.S. Cl. .................................................. 382/154
(58) Field of Classification Search ........................ None
See application file for complete search history.

(56) References Cited

U.S. PATENT DOCUMENTS

| 2,632,058 | A | | 3/1953 | Gray ............................. 179/15 |
| 4,357,108 | A | * | 11/1982 | Stern et al. .................... 356/610 |
| 4,792,209 | A | * | 12/1988 | Laine et al. ................... 359/443 |
| 5,465,121 | A | * | 11/1995 | Blalock et al. ................ 348/744 |
| 6,005,990 | A | * | 12/1999 | Barrett et al. ................. 382/323 |
| 6,489,961 | B1 | * | 12/2002 | Baxter et al. ................. 345/424 |
| 6,570,623 | B1 | * | 5/2003 | Li et al. ....................... 348/383 |
| 7,146,036 | B2 | * | 12/2006 | An Chang et al. ............. 382/154 |
| 7,148,933 | B2 | * | 12/2006 | Childers ....................... 348/745 |
| 2004/0005092 | A1 | * | 1/2004 | Tomasi ......................... 382/154 |

FOREIGN PATENT DOCUMENTS

WO    WO03/056505    *    7/2003

OTHER PUBLICATIONS

J. Battle, Recent progress in Coded Structured Light as a Technique to Solve the Correspondence Problem: A Survey, 1998, published by Elsevier Science Ltd.*
Myers, "A Brief History of Human Computer Interaction Technology," ACM Interactions, vol. 5, No. 2, pp. 44-54, Mar. 1998.

* cited by examiner

*Primary Examiner*—Matthew C Bella
*Assistant Examiner*—Alex Liew
(74) *Attorney, Agent, or Firm*—Dirk Brinkman; Clifton D. Mueller; Gene V. Vinokur

(57) ABSTRACT

An interactive display system includes a pixel-based display surface and a light pen. A sequence of patterns is projected onto the display surface. The sequence of patterns has a unique sequence of light intensities for each location of the display surface. Intensities of light at an arbitrary location are sensed by the light pen while projecting the sequence of patterns. The intensifies of light are decoded to determine coordinates of the arbitrary location.

17 Claims, 6 Drawing Sheets

200

300

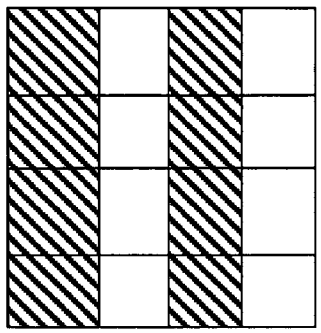
407
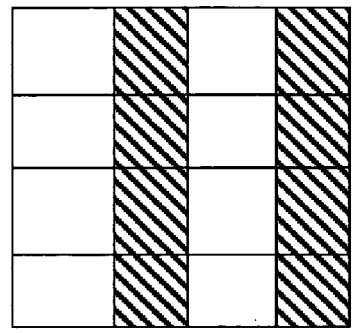
408
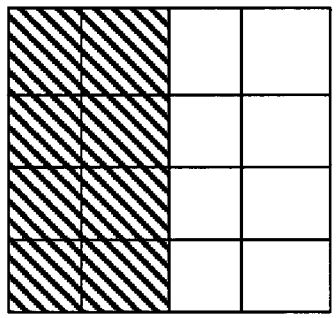
405
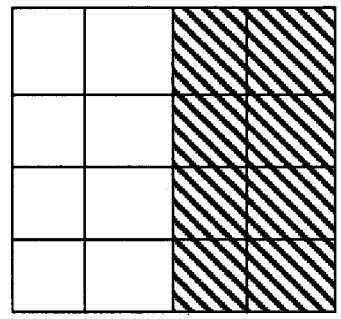
406
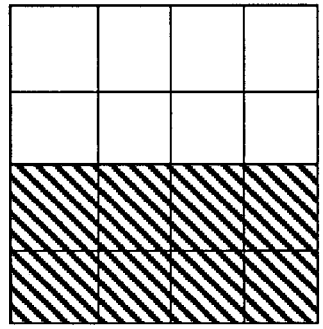
403
404
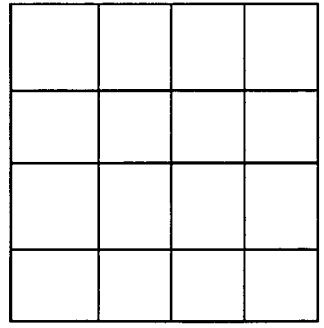
401
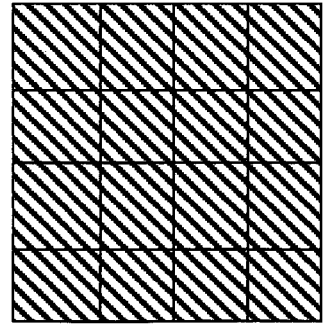
402
*Fig. 4*
400

US 7,421,111 B2

LIGHT PEN SYSTEM FOR PIXEL-BASED DISPLAYS

FIELD OF THE INVENTION

This invention relates generally to input devices for interaction with display systems, and more particularly to light pens used with such displays.

BACKGROUND OF THE INVENTION

Light pens are often used as input devices with graphic user interfaces, see Myers, "A Brief History of Human Computer Interaction Technology," ACM Interactions, Vol. 5, no. 2, pp. 44-54, March 1998, for a brief history. Although light pens have been used since 1954, it was the work of Ivan Sutherland at Lincoln Laboratories, that popularized the use of light pens with computers, Sutherland, "Sketchpad: The First Interactive Computer Graphics," Ph.D. Thesis, MIT, 1963.

As an input device, a light pen has some advantages over a mouse. The mouse is an indirect input device. Movement of the mouse on a horizontal surface causes movement of a cursor on a vertical display. The amount of movement, and speed of movement of the mouse and cursor can be different. In contrast, the pointing of a light pen is direct, and thus more intuitive.

In the prior art, the typical light pen is used with a display system as follows. Most CRT-based displays are raster scanned. Individual pixels on the display are illuminated at predetermined times depending on the location of the pixel in the scanning order. By detecting when a pixel is illuminated, the location of the pixel on the display surface can be determined. Therefore, the typical light pen includes a photo-sensor connected to a timing circuit. The timing of the sensed pixel, synchronized to the raster scanning, reveals its location. Typically, the light pen is held very close, if not in contact with screen.

Unfortunately, the traditional scanned CRT-based displays are being replaced by pixel-oriented displays, such as LCD screens, digital-mirror arrays, and organic LED technologies. These pixel-based displays are not scanned, and thus the traditional light pen technique based on the timing of the raster scan is not applicable for these newer display modalities.

Therefore, there is a need for a system and method that interfaces a light pen with a pixel-based display.

SUMMARY OF THE INVENTION

The invention projects imperceptible patterns of structured light on a pixel-based display device. The patterns can be black and white, gray scale, or full red, green, blue (RGB) colors. Colored patterns can convey more information than binary black and white patterns. The patterns are interleaved with perceptible content.

The patterns are arranged so as to encode location information. While these patterns are imperceptible by the human visual system, the patterns can be detected by photo-sensors. Because the encodings are unique for all pixel locations, it is possible to decode the patterns to determine location information. The patterns of structured light can be spatial, temporal, or spatio-temporally unique at each location.

In the temporal embodiment, the encoding is completely in the time-domain. The pattern of light intensity at each pixel, over time, encodes the location information. Thus, it is sufficient to sample the light intensities at a single pixel over time in order to determine the location of the pixel.

In the spatial embodiment, the location is encoded by unique intensity variations over a neighboring region of pixels. Therefore, a neighborhood of pixels is sampled in order to determine a pixel location. This embodiment uses multiple photo-sensors. As an advantage over the temporal embodiment, the spatial implementation can determine the location from a single pattern.

In the spatio-temporal embodiment, the patterns vary over space and time. This technique can use a smaller neighborhood then in the spatial case and fewer patterns than in the temporal case. Thus, cost and speed can be traded-off to optimize the system for a particular application.

A number of different techniques can be used to make the patterns imperceptible to the human visual system. First, the light can be at infrared (IR) or other frequencies out of the range of human vision. In digital mirror-based projectors, an infrared filter can be added to the color wheel used by such devices.

A second technique uses balanced masking. In this implementation, the light is in the visible range. However, a total sum of light to all pixels is identical over time. For example, each pattern is immediately followed by a reverse or negative of the pattern. When shown in quick succession, the two patterns form a continuous gray tone. If the patterns are displayed for a relatively small amount of time, the only perceptible artifact is a slight decrease in the contrast ratio.

The structured light patterns are detected by a photo-sensor. The detected patterns are decoded to determine the location information.

For the temporal patterns with IR, a light pen with a single photo-sensor yields sufficient information for location estimation. For spatial patterns, an array of photo-sensors, e.g., a camera, is used to detect light intensity variations for the neighborhood of pixels.

BRIEF DESCRIPTION OF THE DRAWINGS

FIG. 4 are patterns according to the invention;

DETAILED DESCRIPTION OF THE PREFERRED EMBODIMENT

Figure 1:
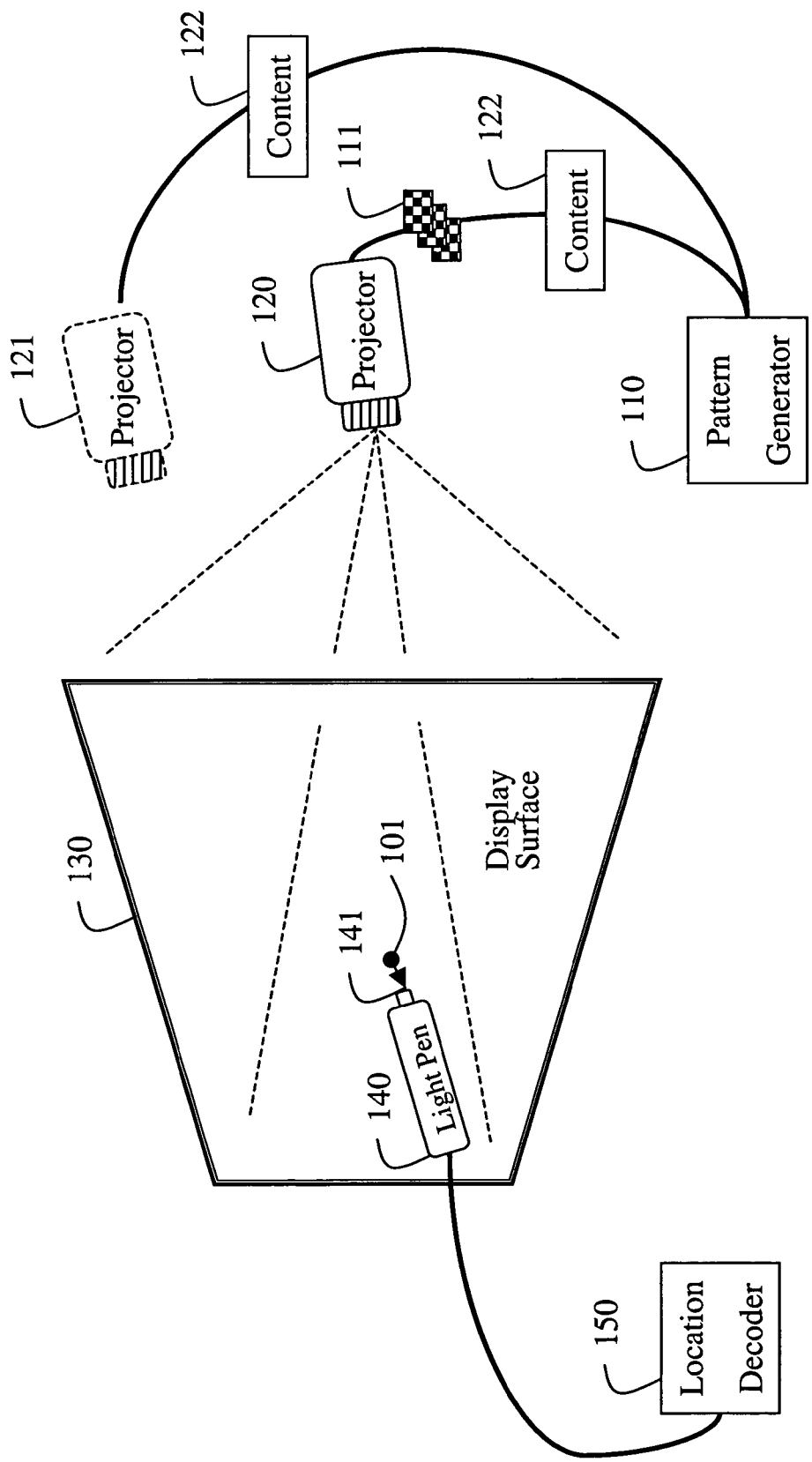
FIG. 1 is a block diagram of a display and light pen system according to the invention.

FIG. 1 shows a light pen system 100 for a pixel-based display. The system includes a pattern and content generator 10 coupled to an image generator 120, e.g., a projector. The image generator renders a sequence of patterns 111 on a display surface 130. In the preferred embodiment, the display surface is pixel-based, instead of raster scanned, although the system also works with raster-scanned displays. The system also includes a light pen 140 coupled to a location decoder 150. The task it to determine 2D coordinates of an arbitrary location 101 on the display surface 130.

The image generator 120 can use a LCD screen, a digital-mirror array, liquid crystal on silicon (LCOS), and organic LED technologies in either front or rear projection modes. It should be noted that the invention can also be used with conventional CRT-based displays. The light pen can use a single photo-sensor 141 or an array of, e.g., CCD, sensors as in a camera. The light pen can include a pressure sensitive switch, which is activated when the sensor is pressed against the display surface. This prevents spurious readings.

In one embodiment, the patterns 111 are projected using infrared (IR) light. This can be accomplished by passing light through a condensing lens, an infrared color filter mounted on a color wheel, a shaping lens, to a digital mirror device (DMD), and then through a projector lens onto the display surface 130. These technologies are well known.

The sequence of patterns 111 is generated by changing sequentially states of the mirrors. Because the patterns are detected by the photo-sensor 141, rather than the human visual system, the patterns can be generated at an extremely high rate, e.g., greater than 1 KHz. It is known that the human visual system is sensitive to stimuli only in a certain temporal window, called the window of visibility, see Watson et al., "Window of Visibility: a psychophysical theory of fidelity in time-sampled visual motion displays," J. Opt. Soc. Am. A, Vol. 3, No. 3, pp. 300-307, March 1986. The human visual system cannot comprehend images beyond a certain temporal frequency limit. The invention generates on the order of a hundred unique patterns in one millisecond, which is well outside the temporal window of visibility.

Figure 2:
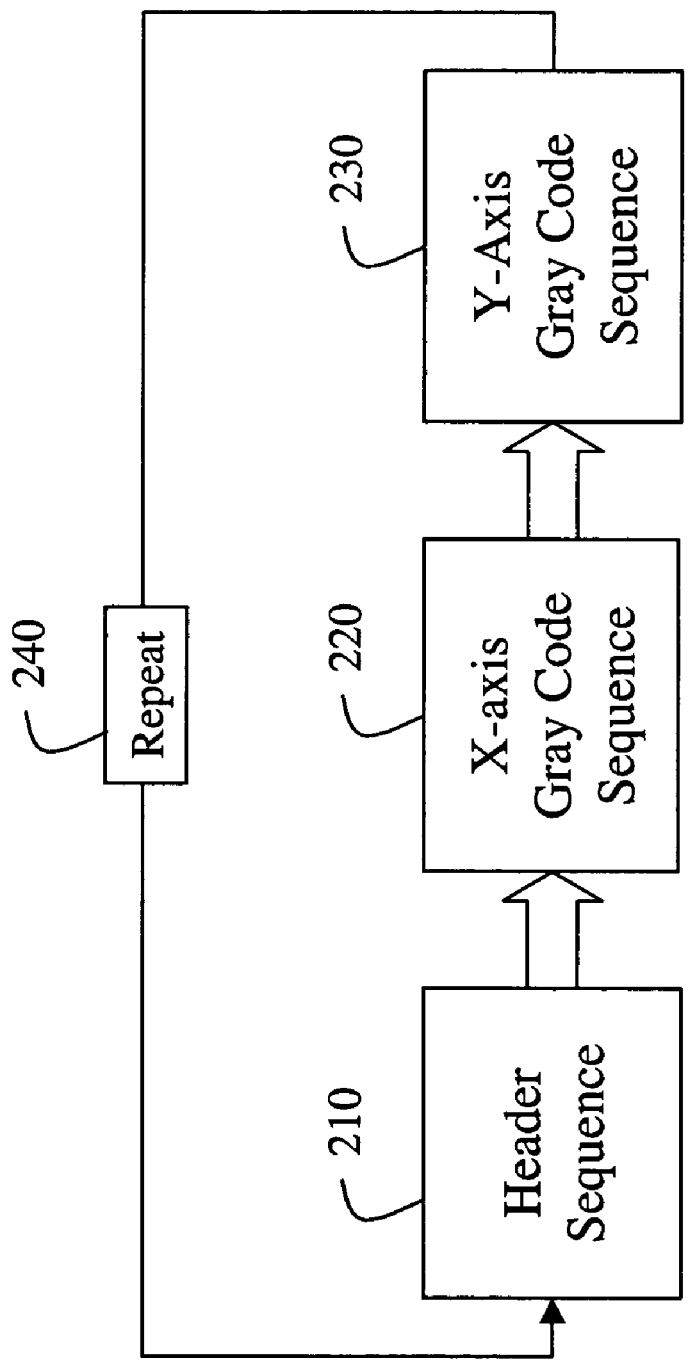
FIG. 2 is a flow diagram of a process for generating imperceptible patterns according to the invention.

As shown in FIG. 2, the sequence of patterns is generated 200 repeatedly 240 and has the following distinct parts. First, a header pattern is generated 210. In the header pattern, all pixels switched on and off in unison as described below. The header pattern is used to indicate the start of the sequence, the rate at which the patterns are generated. The header can also be used to calibrate the light pen to the relative light and dark intensities of the patterns. In the case of a multiple projector system, as described below, the header can also identify the projector.

Next, horizontal Gray code 220 and vertical Gray code 230 patterns are generated, see Gray, "Pulse Code Communication", U.S. Pat. No. 2,632,058, Mar. 17, 1953. These patterns have a unique temporal sequence of light intensities for each individual pixel of the display 130. If groups of pixels are sensed, then each group has a unique pattern. That way, sensing the light intensity at a particular pixel over time, and decoding the pattern can determine the 2D coordinates of the location 101 of the pixel.

While Gray codes are not the only way to achieve this property, Gray codes have other benefits. Most important, Gray code patterns guarantee that edges in succeeding patterns do not line up. This minimizes ambiguity in the case where the light pen 140 also senses parts of neighboring pixels.

FIG. 4 shows a sequence of patterns 400 for a 4×4 pixel array. The first pattern 401 is all light, the second pattern 402 is the reverse of the first pattern, i.e., all dark. This pair of patterns is the header and enables the light pen to synchronize to the start of the sequence. This header pair of patterns can also give reference levels of light intensity for calibration purposes by averaging the patterns. In addition, the length of time the header patterns are displayed indicates the timing of the patterns. Thus, the pattern generator 110 and the decoder 150 do not need to be synchronized with each other. The header patterns can be repeated in an arbitrary order to generate a binary signal from the all light and dark patterns, e.g. 01011101, where the first four 'bits' are a start of sequence indicator, and the next n are other information.

Each following pair 403-404, 405-406, 407-408 divides the display in half, down to the pixel level, first for the horizontal version, and then for the vertical version so that the adjacency property of the Gray code is met. The light pen is inactive most of the time while the underlying perceptible content is displayed.

Figure 3:
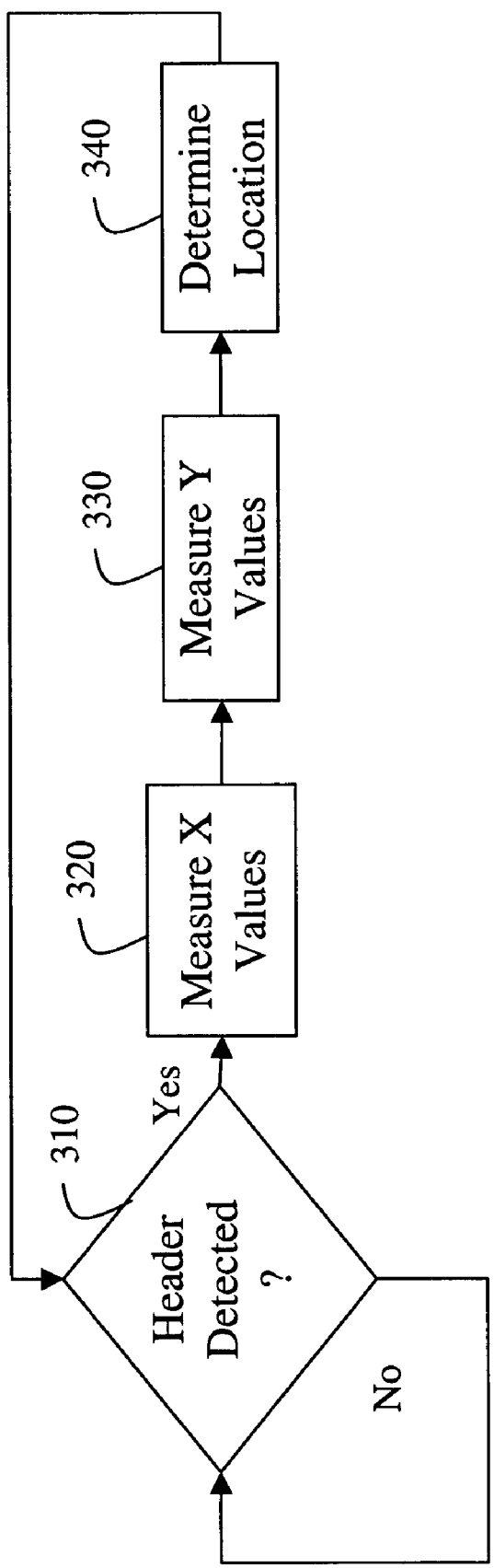
FIG. 3 is a flow diagram of a process for decoding patterns according to the invention to obtain location information.

FIG. 3 shows the location decoding method 300. First, the header is detected 310. Then, the horizontal intensity values are measured 320, followed by measuring 330 the vertical intensity values. From these measured values, the coordinates of the location 101 are determined 340.

It should be noted that the duration of each pattern image can be extremely short, on the order of 10 microseconds. For a conventional XGA resolution projector, only twenty-two patterns are required for the header and all location information. Thus, the sequence of patterns can be very short, e.g., less than 1 millisecond. Thus, adding the sequence 111 has minimal impact on an overall brightness of the projected display. In fact, the impact is so small, that the sequences can be displayed at a higher rate to increase the update rate of the location information.

Other embodiments are possible. For organic LED displays, adding IR emitters may be impractical. In this case, the location information is encoded in red, green or blue (RGB) patterns. This is done in a way so that the patterns remain imperceptible. One way displays each pattern for a very short time, as described above.

When large 'dark' regions are displayed, it is possible that some varying light intensities are perceived. This can be remedied by a balance masking technique. In this technique, each image is immediately followed by its reverse or negative. This gives every pixel a 50% duty cycle on average while the sequence of patterns is displayed. The net perceived effect is an almost imperceptible smooth grey image, which is the average of all images in the sequence, which only results in a slight loss of contrast.

For LCD-based displays, it may be difficult to achieve the speed required for a strictly temporal solution. One way of decreasing the number of patterns in the sequence is to enlarge the sensing area by using multiple sensors in the light pen 140.

In an extreme case, the sequence 111 has a single pattern. In this system, the light pen has as at least as many sensors as the number of patterns in the temporal sequence, i.e., twenty-two.

Figure 6:
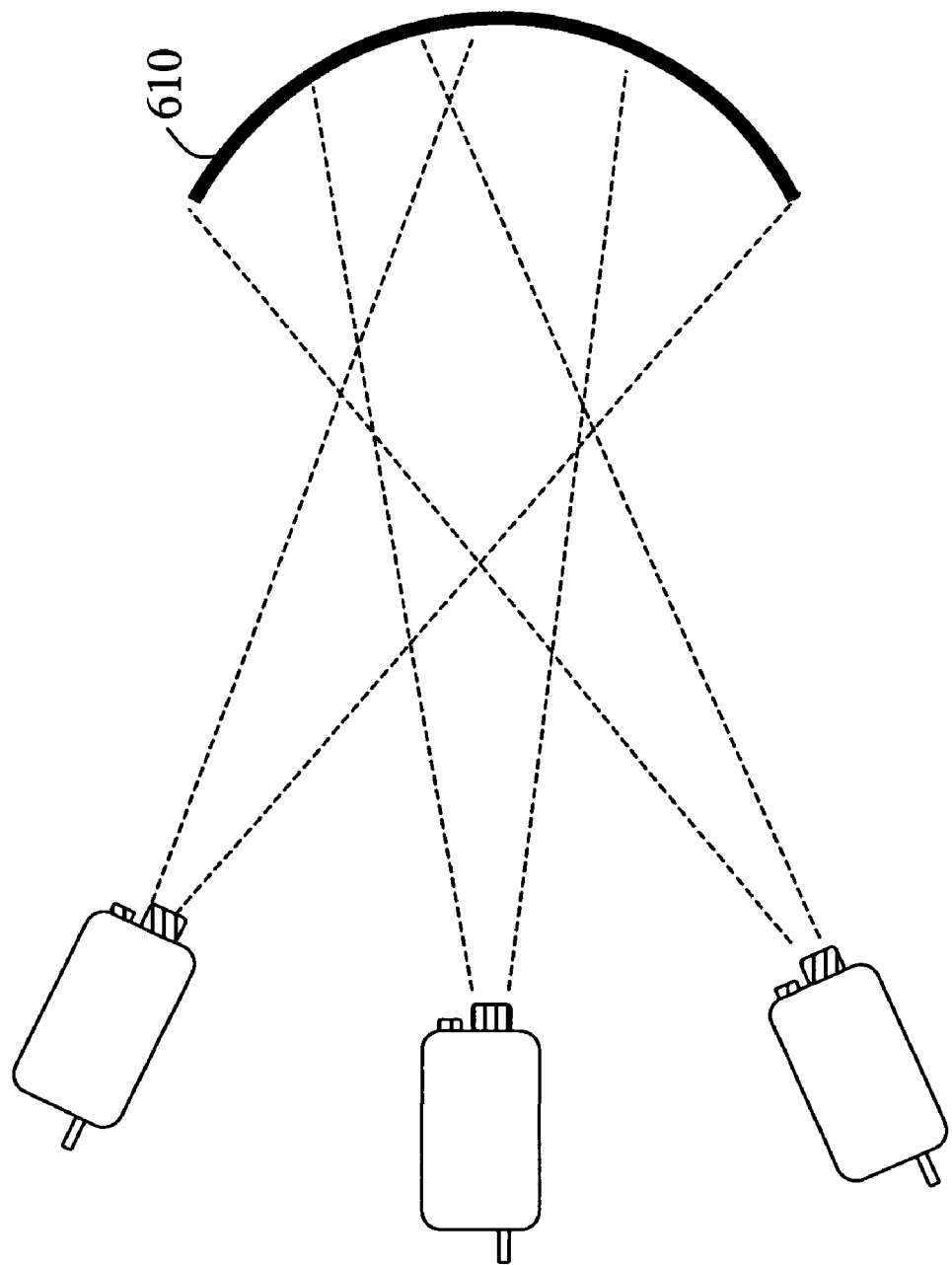
FIG. 6 is a diagram of a display system with a curved surface.

In an alternative embodiment, two projectors are used, a first projector displays the imperceptible patterns 111, while a second projector 121 displays the underlying perceptible content 122. A third projector, not shown, can interleave a second sequence of patterns so that 3D coordinates of the location information can be obtained in the case where the display surface 610 is curved as shown in FIG. 6, and as described in U.S. patent application Ser. No. 10/394,315, "Method and System for Displaying Images on Curved Surfaces," filed by Raskar et al., on Mar. 21, 2003, incorporated herein by reference.

Figure 5:
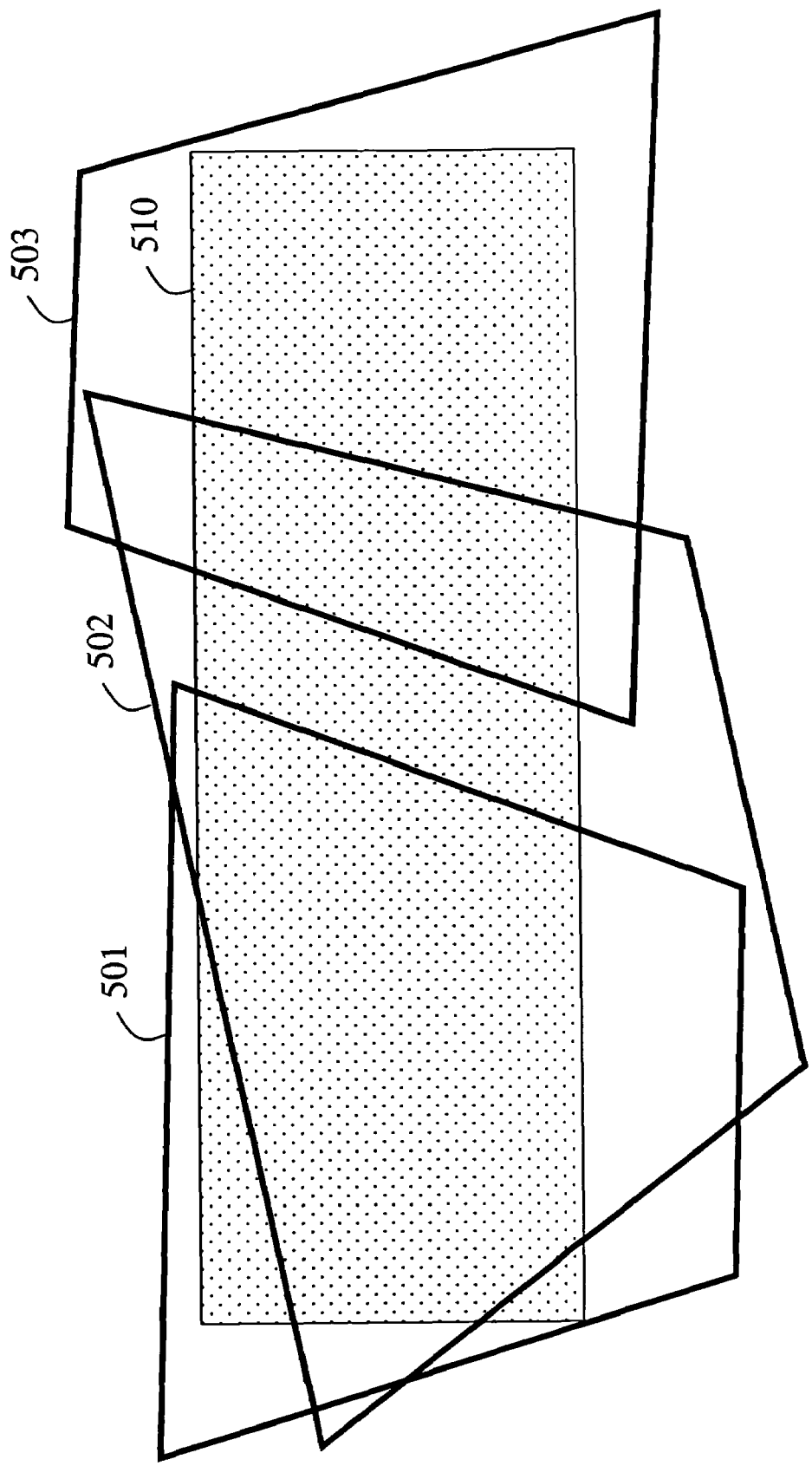
FIG. 5 is a block diagram of a display mosaic.

In yet an another alternative embodiment shown in FIG. 5, the display is a mosaic of partially overlapping images 501 to generate a larger panoramic images 510 as described in U.S. patent application Ser. No. 10/394,688, "Self-Configurable Ad-Hoc Projector Cluster," filed by Raskar et al., on Mar. 21, 2003, incorporated herein by reference. In this case, each header sequence 210 can include an identification so that the decoder can differentiate the different sequences of patterns projected by multiple projectors.

It should also be noted, that multiple light pens can be used simultaneously in a multi-user interface. Thus, the invention has advantages over resistive touch screens, which are relatively expensive and can only distinguish a single touched location, at any one time. Conventional vision-based systems are also more complex to implement and those type of systems have a problem with shadowing and accuracy.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining coordinates of a location on a display surface, comprising:
    projecting a sequence of patterns onto the display surface using a projector, the sequence of patterns having a unique sequence of light intensities for each location of the display surface, and each unique sequence encoding coordinates of the corresponding location, and in which the sequence of patterns includes a header sequence of patterns;
    sensing the light intensities at an arbitrary location of the display surface using an optical sensor while projecting the sequence of patterns;
    determining a rate of the patterns from the header sequence of patterns; and
    decoding the sensed light intensities according to the rate of the patterns to determine coordinates of the arbitrary location on the display surface.

2. The method of claim 1, in which the sequence of patterns encoding the coordinates is in a form of Gray codes.

3. The method of claim 1, in which the display surface is planar and the coordinates are two-dimensional.

4. The method of claim 1, in which the display surface is quadric and the coordinates determined from the sensed light intensities are three-dimensional.

5. The method of claim 1, in which the optical sensor and the projector are on opposite sides of the display surface.

6. The method of claim 1, in which the optical sensor is a single photo diode of a light pen.

7. The method of claim 1, in which the optical sensor is a light pen with a plurality of light sensitive elements.

8. The method of claim 1, in which the light intensities encoding the coordinates are infrared.

9. The method of claim 1, in which the sequence of patterns is generated as pairs, a second pattern in the pair being inverse of the first pattern in the pair.

10. The method of claim 1, in which display surface is pixel-based.

11. The method of claim 1, further comprising:
    detecting the header sequence of patterns to determine a start of the sequence of patterns.

12. The method of claim 1, further comprising:
    calibrating the optical sensor to relative light intensities from the header sequence of patterns.

13. The method of claim 1, in which the sequence of patterns encoding coordinates is imperceptible to a human visual system.

14. The method of claim 13, farther comprising:
    displaying perceptible content on the display surface while displaying the sequence of patterns.

15. The method of claim 1, in which the header sequence includes an identification of the sequence of patterns.

16. An interactive display system, comprising:
    a display surface;
    a projector configured to display a sequence of patterns onto the display surface, the sequence of patterns having a unique sequence of light intensities for each location of the display surface, and each unique sequence of light intensities encoding coordinates of the corresponding location, and in which the sequence of patterns includes a header sequence of patterns;
    an optical sensor configured to sense the light intensities at an arbitrary location on the display surface, while the projector displays the sequence of patterns;
    means for determining a rate of the patterns from the header sequence of patterns; and
    means for decoding the sensed light intensities according to the rate of the patterns to determine coordinates of the arbitrary location.

17. The system of claim 16, in which the display surface is pixel-based, and the patterns are Gray codes.

* * * * *